United States Patent
Cassion et al.

(10) Patent No.: US 11,503,892 B1
(45) Date of Patent: Nov. 22, 2022

(54) ILLUMINATED PRESS ON NAIL

(71) Applicants: Tyrie Cassion, Worcester, MA (US);
Kellii Cassion, Worcester, MA (US)

(72) Inventors: Tyrie Cassion, Worcester, MA (US);
Kellii Cassion, Worcester, MA (US)

(*) Notice: Subject to any disclaimer, the term of this patent is extended or adjusted under 35 U.S.C. 154(b) by 54 days.

(21) Appl. No.: 17/158,158

(22) Filed: Jan. 26, 2021

(51) Int. Cl.
| | |
|---|---|
| A45D 31/00 | (2006.01) |
| F21V 23/00 | (2015.01) |
| F21V 33/00 | (2006.01) |
| H02J 50/10 | (2016.01) |
| G06K 7/10 | (2006.01) |
| G06K 19/07 | (2006.01) |
| H02J 7/02 | (2016.01) |
| F21Y 113/10 | (2016.01) |
| F21Y 115/10 | (2016.01) |

(52) U.S. Cl.
CPC ............ *A45D 31/00* (2013.01); *F21V 23/003* (2013.01); *F21V 33/0008* (2013.01); *G06K 7/10366* (2013.01); *G06K 19/0723* (2013.01); *H02J 7/02* (2013.01); *H02J 50/10* (2016.02); *A45D 2200/20* (2013.01); *F21Y 2113/10* (2016.08); *F21Y 2115/10* (2016.08)

(58) Field of Classification Search
CPC ..... A45D 31/00; A45D 2200/20; H02J 50/10; H02J 7/02; F21V 23/003; F21V 33/0008; G06K 7/10366; G06K 19/0723; F21Y 2113/10; F21Y 2115/10
See application file for complete search history.

(56) References Cited

U.S. PATENT DOCUMENTS

| | | |
|---|---|---|
| D278,939 S | 5/1985 | Hokama |
| 8,176,924 B2 | 5/2012 | Schneider |
| 8,689,806 B2 | 4/2014 | Tufts |
| 2003/0217758 A1* | 11/2003 | Mesirow .................. B41J 3/407 132/73.5 |
| 2007/0295349 A1 | 12/2007 | Simpson |
| 2010/0066710 A1 | 3/2010 | Koibuchi |
| 2014/0224270 A1 | 8/2014 | Nunez |
| 2016/0295989 A1* | 10/2016 | Hakeem ............... A45D 44/005 |

* cited by examiner

Primary Examiner — Bao Q Truong
(74) Attorney, Agent, or Firm — Kyle A. Fletcher, Esq.

(57) ABSTRACT

The illuminated press on nail is a press on nail. The press on nail is a cosmetic structure that is worn by a client on a location selected from the group consisting of a finger nail and a toe nail. The illuminated press on nail comprises a press on nail, a control circuit, and a personal data device. The control circuit mounts is an illumination circuit that mounts in the press on nail. The personal data device forms a wireless communication link with the control circuit. The personal data device controls the operation of the control circuit. By controlling the operation is meant the personal data device controls the color of the illumination generated by the control circuit.

18 Claims, 6 Drawing Sheets

ILLUMINATED PRESS ON NAIL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of human necessities including cosmetic treatments, more specifically, artificial nails. (A45D31/00)

SUMMARY OF INVENTION

The illuminated press on nail is a press on nail. The press on nail is a cosmetic structure that is worn by a client on a location selected from the group consisting of a finger nail and a toe nail. The illuminated press on nail comprises a press on nail, a control circuit, and a personal data device. The control circuit mounts is an illumination circuit that mounts in the press on nail. The personal data device forms a wireless communication link with the control circuit. The personal data device controls the operation of the control circuit. By controlling the operation is meant the personal data device controls the color of the illumination generated by the control circuit. In an alternate potential embodiment of the disclosure, the illuminated press on nail further comprises a stylus. The stylus is a repeater. The primary function of the stylus is to amplify a plurality of RFID tracking signals that form the wireless communication link between the personal data device and the control circuit.

These together with additional objects, features and advantages of the illuminated press on nail will be readily apparent to those of ordinary skill in the art upon reading the following detailed description of the presently preferred, but nonetheless illustrative, embodiments when taken in conjunction with the accompanying drawings.

In this respect, before explaining the current embodiments of the illuminated press on nail in detail, it is to be understood that the illuminated press on nail is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the illuminated press on nail.

It is therefore important that the claims be regarded as including such equivalent construction insofar as they do not depart from the spirit and scope of the illuminated press on nail. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
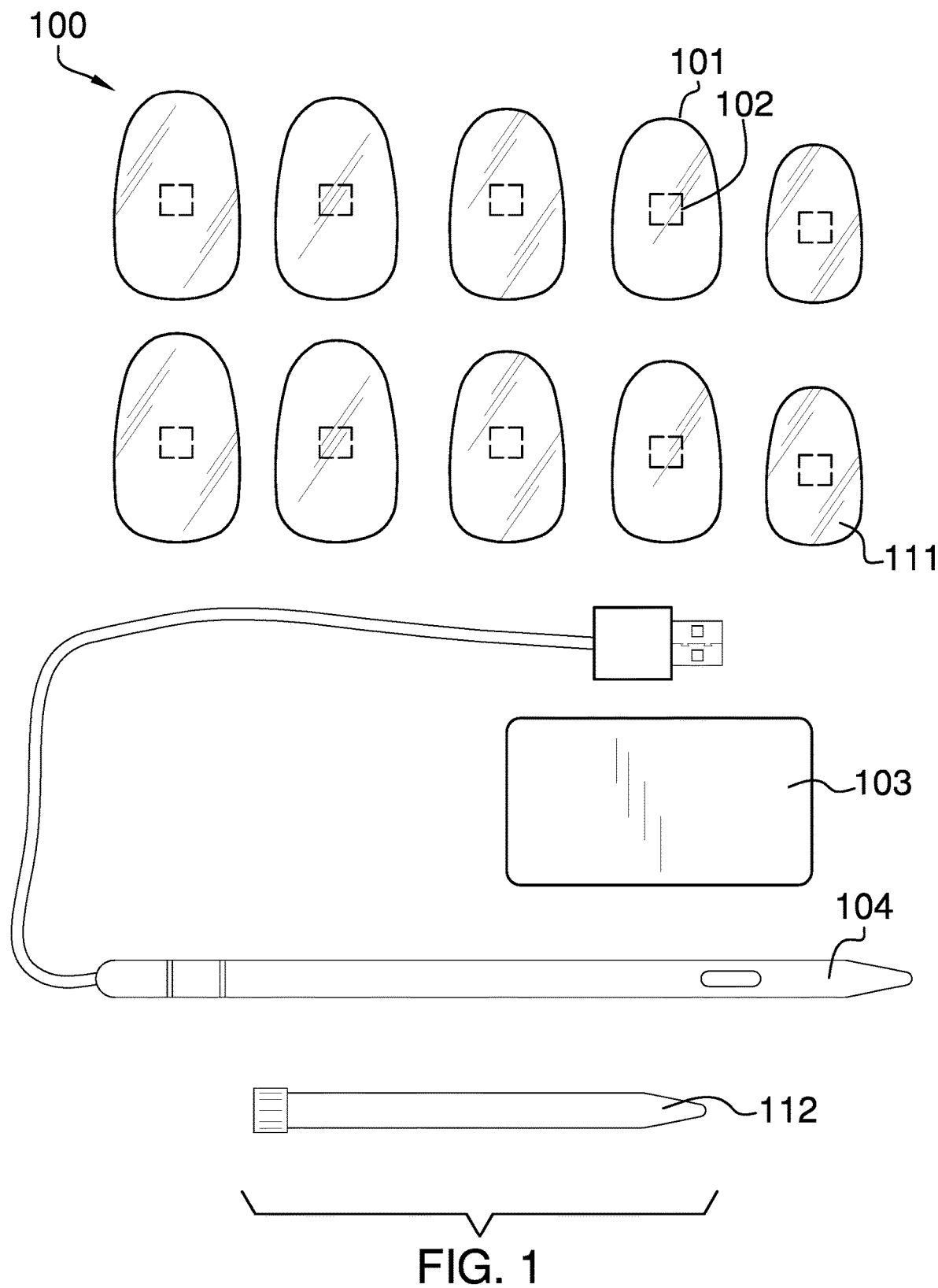
FIG. 1 is a kit view of an embodiment of the disclosure.
Figure 2:
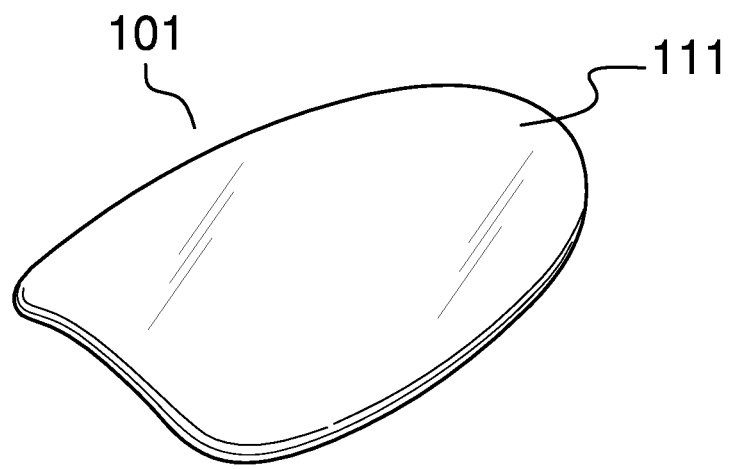
FIG. 2 is a perspective view of an embodiment of the disclosure.
Figure 3:
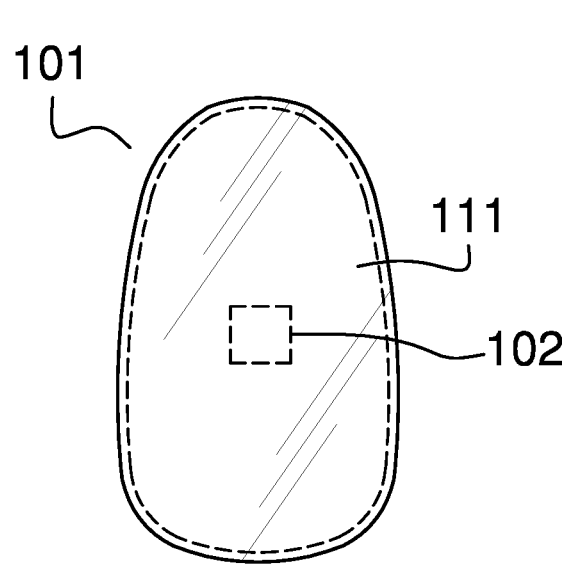
FIG. 3 is a front view of an embodiment of the disclosure.
Figure 4:
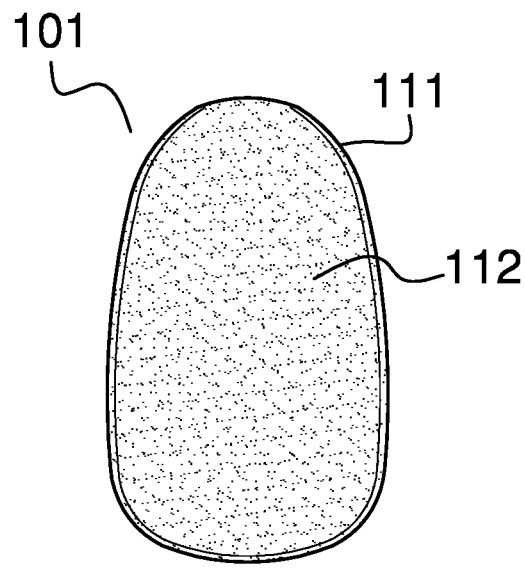
FIG. 4 is a rear view of an embodiment of the disclosure.
Figure 5:
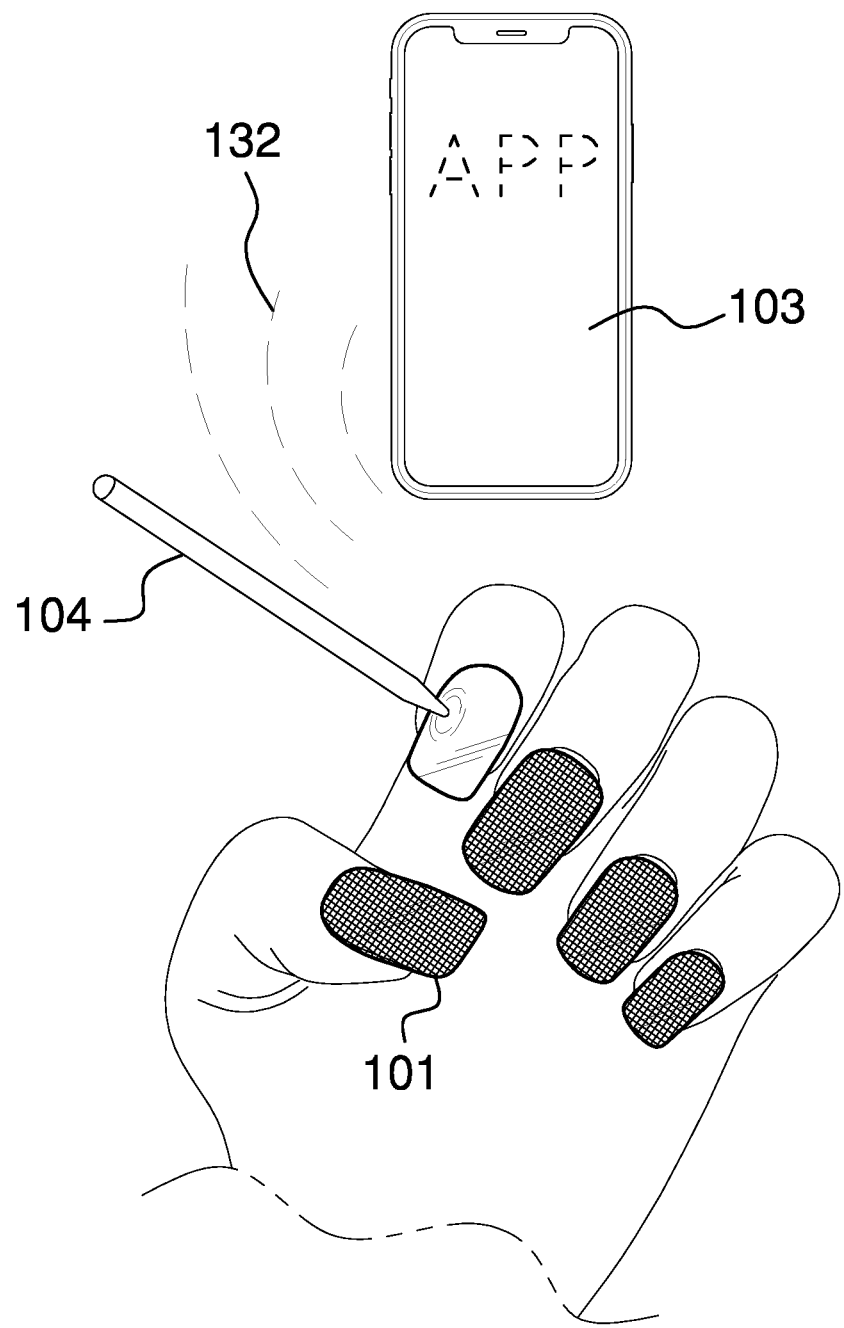
FIG. 5 is an in-use view of an embodiment of the disclosure.
Figure 6:
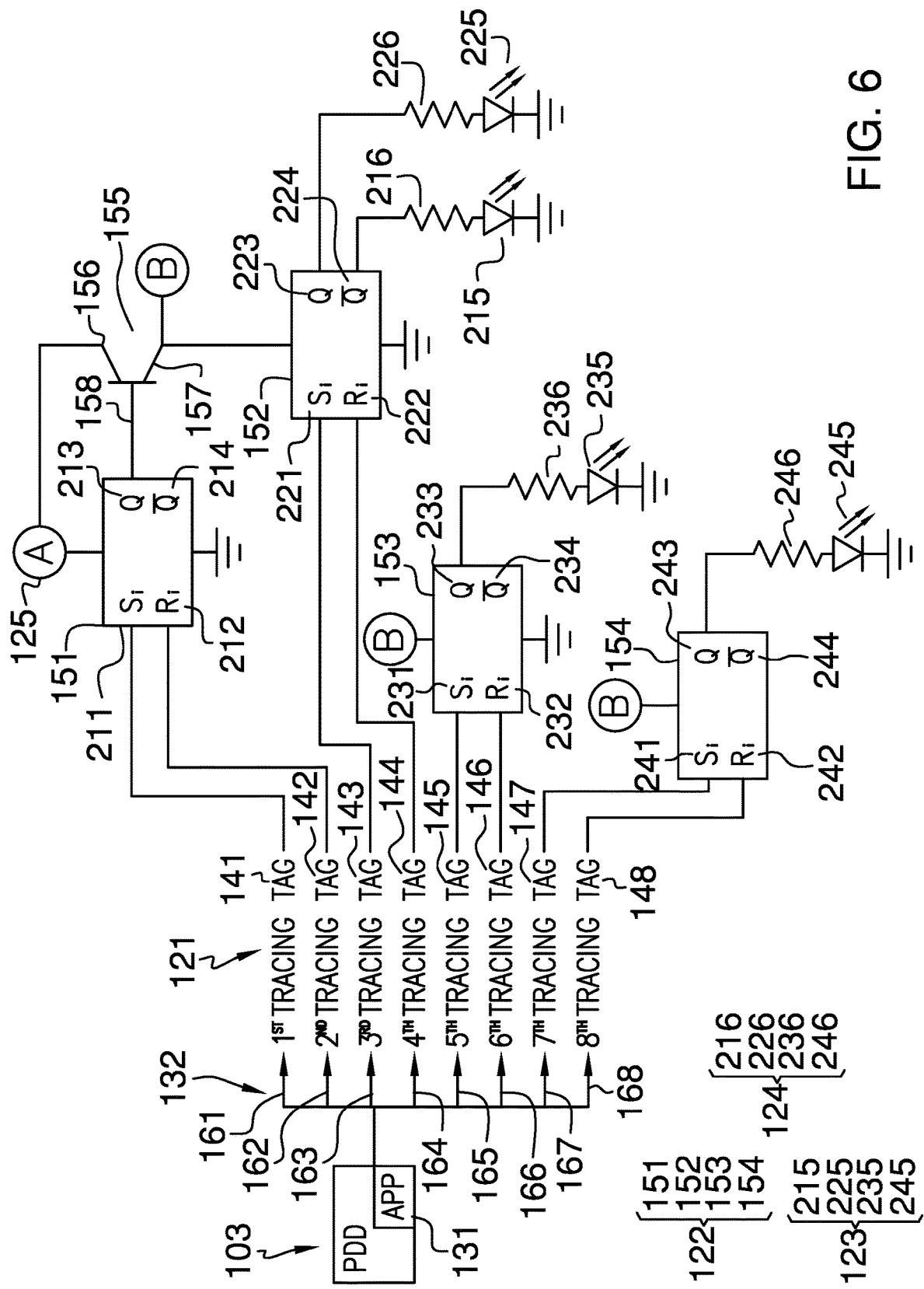
FIG. 6 is a schematic view of an embodiment of the disclosure.
Figure 7:
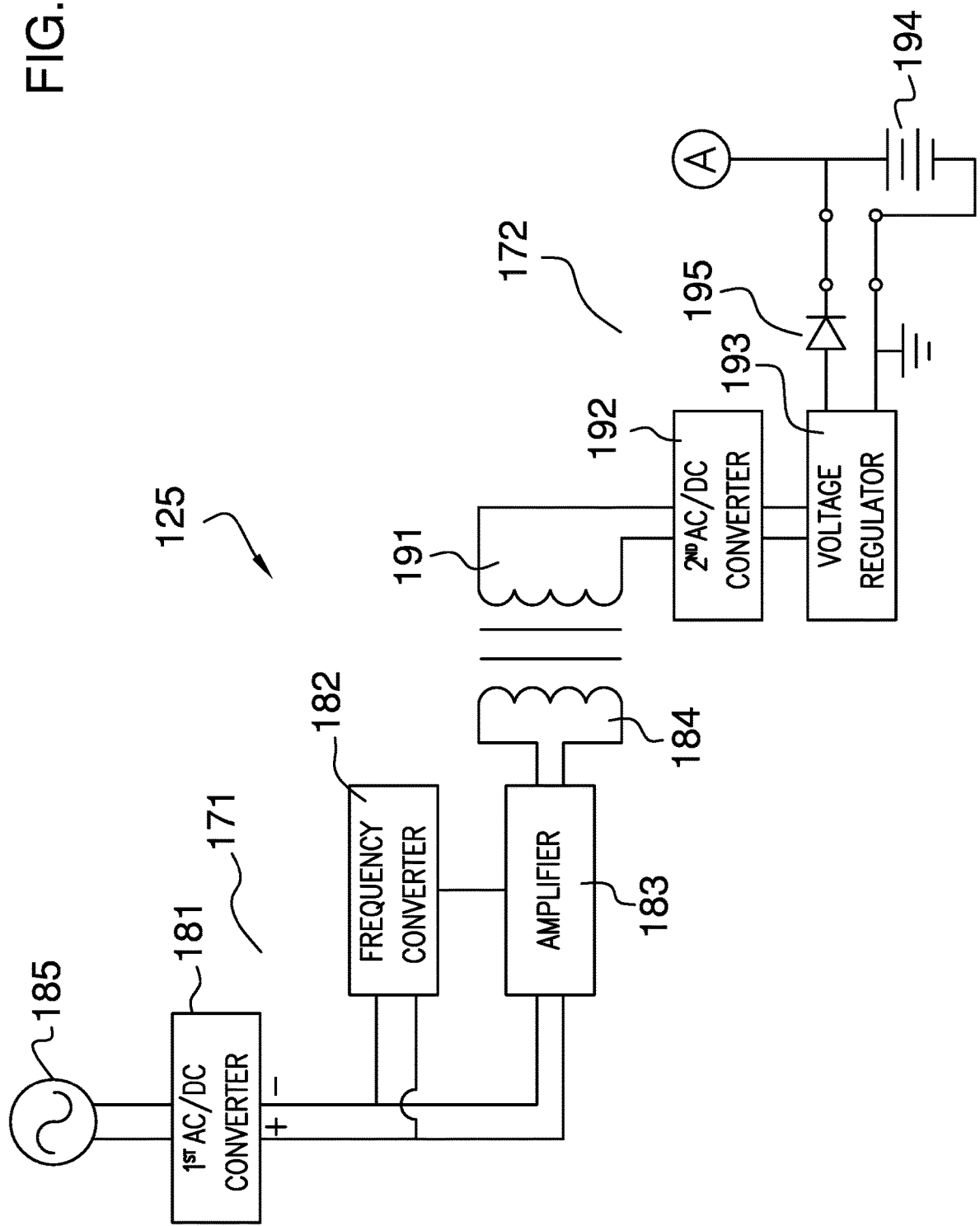
FIG. 7 is a schematic view of an embodiment of the disclosure.
Figure 8:
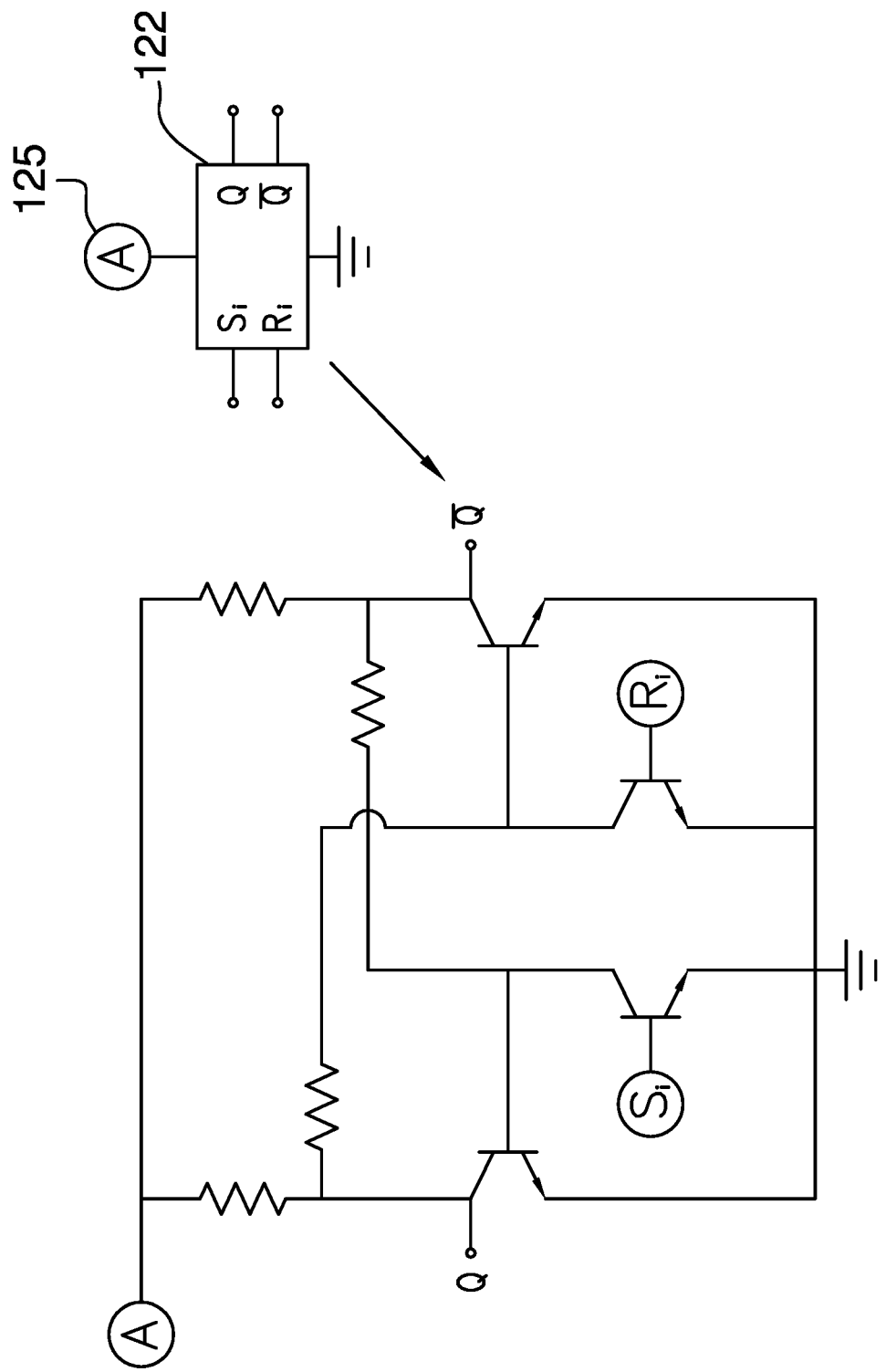
FIG. 8 is a schematic view of an embodiment of the disclosure.

Detailed reference will now be made to one or more potential embodiments of the disclosure, which are illustrated in FIGS. 1 through 8.

The illuminated press on nail 100 (hereinafter invention) is a press on nail 101. The press on nail 101 is a cosmetic structure that is worn by a client on a location selected from the group consisting of a finger nail and a toe nail. The invention 100 comprises a press on nail 101, a control circuit 102, and a personal data device 103. The control circuit 102 mounts is an illumination circuit that mounts in the press on nail 101. The personal data device 103 forms a wireless communication link with the control circuit 102. The personal data device 103 controls the operation of the control circuit 102. By controlling the operation is meant the personal data device 103 controls the color of the illumination generated by the control circuit 102. In a third potential embodiment of the disclosure, the invention 100 further comprises a stylus 104. The stylus 104 is a repeater. The primary function of the stylus 104 is to repeat and amplify a plurality of RFID interrogation signals 132 that form the wireless communication link between the personal data device 103 and the control circuit 102.

The press on nail 101 is a cosmetic structure. The press on nail 101 is worn on the nail of an extremity selected from the group consisting of a hand and a foot. The press on nail 101 contains the control circuit 102. The press on nail 101 illuminates the control circuit 102. The press on nail 101 comprises a nail structure 111 and an adhesive 112.

The nail structure 111 is a mechanical structure. The nail structure 111 is a polymer based structure. The nail structure is an acrylic poly(methyl methacrylic) (CAS 9011-14-7) based structure. The nail structure 111 is a non-Euclidean disk structure. The form factor of the nail structure 111 is selected such that the nail structure 111 emulates the form factor of a human nail. The control circuit 102 mounts on the nail structure 111 such that the illumination of the control circuit 102 is visible from the exterior of the client wearing the invention 100. The adhesive 112 is a chemical compound. The adhesive 112 is defined elsewhere in this disclosure. The adhesive 112 secures the nail structure 111 to the selected nail of the client.

The personal data device 103 is a programmable electrical device that provides data management and communication services through one or more functions referred to as an application 131. The personal data device 103 comprises an application 131 and a plurality of RFID interrogation signals 132. The application 131 is a set of logical operating instructions that are performed by the personal data device 103. The addition of an application 131 will provide increased functionality for the personal data device 103. This disclosure assumes that an application 131 exists for the purpose of interacting with the invention 100. Methods to design and implement an application 131 on a personal data device 103 are well known and documented in the electrical arts.

The personal data device 103 forms a wireless communication link with the control circuit 102. The personal data device 103 controls the operation of the control circuit 102. By controlling the operation of the control circuit 102 is meant that the personal data device 103 turns the control circuit 102 on and off. By controlling the operation of the control circuit 102 is meant that the personal data device 103 changes the color of the illumination generated by the control circuit 102.

The application 131 is associated with the near field communication capability of the personal data device 103. The application 131 is used to generate and transmit the plurality of RFID interrogation signals 132.

The plurality of RFID interrogation signals 132 is a radio frequency transmission that is generated by the near field communication functionality of the personal data device 103. Each of the plurality of RFID interrogation signals 132 is an antenna that is tuned to a frequency. The tuned frequency of each of the plurality of RFID interrogation signals 132 is selected to match the tuned frequency of an RFID tracking tag selected from the plurality of RFID tracking tags 121. The tuned frequency of each RFID interrogation signal selected from the plurality of RFID interrogation signals 132 is selected such that the transmitted RFID interrogation signal will only be detected by the associated RFID tracking tag. The personal data device 103 controls the operation of the control circuit 102 through the selection and transmission of each of the plurality of RFID interrogation signals 132.

The plurality of RFID interrogation signals 132 forms the wireless communication link with the control circuit 102. The plurality of RFID interrogation signals 132 comprises a first RFID interrogation signal 161, a second RFID interrogation signal 162, a third RFID interrogation signal 163, and a fourth RFID interrogation signal 164. The first RFID interrogation signal 161, the second RFID interrogation signal 162, the third RFID interrogation signal 163, and the fourth RFID interrogation signal 164 are described elsewhere in this disclosure.

The control circuit 102 is an electric circuit. In the first potential embodiment of the disclosure, the control circuit 102 is formed as an integrated circuit. The control circuit 102 mounts in the nail structure 111 of the press on nail 101. The control circuit 102 generates the illumination used to illuminate the press on nail 101. The color of the illumination of the control circuit 102 is adjustable. The personal data device 103 controls the operation of the control circuit 102. By controlling the operation of the control circuit 102 is meant that the personal data device 103 turns the control circuit 102 on and off. By controlling the operation of the control circuit 102 is meant that the personal data device changes the color of the illumination generated by the control circuit 102. The control circuit 102 is an independently powered electric circuit. By independently powered is meant that the control circuit 102 can operate without an electrical connection to an external power source.

The control circuit 102 comprises a plurality of RFID tracking tags 121, a plurality of flip flops 122, a plurality of LED sets 123, a plurality of limit resistors 124, and a wireless power circuit 125. The plurality of RFID tracking tags 121, the plurality of flip flops 122, the plurality of LED sets 123, the plurality of limit resistors 124, and the wireless power circuit 125 are electrically interconnected.

Each of the plurality of RFID tracking tags 121 is an RFID tracking tag. The RFID tracking tag is defined elsewhere in this disclosure. Each of the plurality of RFID tracking tags electrically connects to a flip flop selected from the plurality of flip flops 122. Each of the plurality of RFID tracking tags 121 is an antenna that is tuned to a frequency. The tuned frequency of any initially RFID tracking tag selected from the plurality of RFID tracking tags 121 is different from the tuned frequency of any subsequent RFID tracking tag selected from the plurality of RFID tracking tags 121.

There is a one to one correspondence between the plurality of RFID tracking tags 121 and the plurality of RFID interrogation signals 132. The tuned frequency of each RFID tracking tag selected from the plurality of RFID tracking tags 121 matches the transmission frequency of the RFID interrogation signal selected from the plurality of RFID interrogation signals 132 that corresponds with the selected RFID tracking tag.

Each of the plurality of RFID tracking tags 121 is a passive electrical circuit. Each of the plurality of RFID tracking tags 121 transmits the received RFID interrogation signal to an input of the connected flip flop such that the RFID interrogation signal triggers the operation of the connected flip flop.

The plurality of RFID tracking tags 121 comprises a first RFID tracking tag 141, a second RFID tracking tag 142, a third RFID tracking tag 143, and a fourth RFID tracking tag 144.

The first RFID tracking tag 141 is the tracking tag selected from the plurality of RFID tracking tags 121 that is tuned to detect the transmission of the first RFID interrogation signal 161 by the personal data device 103. The first RFID tracking tag 141 electrically connects as an input to the first flip flop 151.

The second RFID tracking tag 142 is the tracking tag selected from the plurality of RFID tracking tags 121 that is tuned to detect the transmission of the second RFID interrogation signal 162 by the personal data device 103. The second RFID tracking tag 142 electrically connects as an input to the first flip flop 151.

The third RFID tracking tag 143 is the tracking tag selected from the plurality of RFID tracking tags 121 that is tuned to detect the transmission of the third RFID interrogation signal 163 by the personal data device 103. The third RFID tracking tag 143 electrically connects as an input to the second flip flop 152.

The fourth RFID tracking tag 144 is the tracking tag selected from the plurality of RFID tracking tags 121 that is tuned to detect the transmission of the fourth RFID interrogation signal 164 by the personal data device 103. The fourth RFID tracking tag 144 electrically connects as an input to the second flip flop 152.

Each of the plurality of flip flops 122 is an electric circuit known as a flip flop. The flip flop is defined elsewhere in this disclosure. The operation of the flip flop is described elsewhere in this disclosure. Each of the plurality of flip flops 122 generates a stable output. The stable output of each of the plurality of flip flops 122 is changed by a transient input signal. Each of the plurality of flip flops 122 electrically connects to two RFID tracking tags selected from the plurality of RFID tracking tags 121. Each flip flop selected from the plurality of flip flops 122 receives transient inputs from the two RFID tracking tags associated with the selected flip flop. Each flip flop selected from the plurality of flip flops 122 comprises one or more outputs.

A flip flop selected from the plurality of flip flops 122 powers the operation of the unselected flip flops remaining in the plurality of flip flops 122. The unselected flip flops remaining in the plurality of flip flops 122 power the illumination of the plurality of LED sets 123.

The plurality of flip flops 122 comprises a first flip flop 151, a second flip flop 152, and a transistor 155. The transistor 155 electrically connects to the first flip flop 151. The transistor 155 further comprises a collector 156, an emitter 157, and a base 158. The plurality of LED sets 123 comprises a first LED set 215 and a second LED set 225. The plurality of limit resistors 124 comprises a first limit resistor 216 and a second limit resistor 226. The first LED set 215 and the first limit resistor 216 electrically connect to the second flip flop 152. The second LED set 225 and the second limit resistor 226 electrically connect to the second flip flop 152.

The first RFID interrogation signal 161 is the interrogation signal selected from the plurality of RFID interrogation signals 132 that indicates to the control circuit 102 that the transistor 155 should be actuated to a closed switch position. The second RFID interrogation signal 162 is the interrogation signal selected from the plurality of RFID interrogation signals 132 that indicates to the control circuit 102 that the transistor 155 should be actuated to an open switch position.

The third RFID interrogation signal 163 is the interrogation signal selected from the plurality of RFID interrogation signals 132 that indicates to the control circuit 102 that the first LED set 215 should be extinguished and the second LED set 225 should be actuated. The fourth RFID interrogation signal 164 is the interrogation signal selected from the plurality of RFID interrogation signals 132 that indicates to the control circuit 102 that the second LED set 225 should be extinguished and the first LED set 215 should be actuated.

The first flip flop 151 is the flip flop selected from the plurality of flip flops 122 that controls the operation of the transistor 155. The first flip flop 151 controls the flow of the electricity used to power the second flip flop 152. The second flip flop 152 is the flip flop selected from the plurality of flip flops 122 that controls the operation of the both the first LED set 215 and the second LED set 225 of the plurality of LED sets 123. The first flip flop 151 comprises a first set input 211, a first reset input 212, a first Q output 213, and a first not Q output 214. The second flip flop 152 comprises a second set input 221, a second reset input 222, a second Q output 223, and a second not Q output 224.

The first set input 211 is the set input of the first flip flop 151. A transient input to the first set input 211 actuates the first Q output 213 and turns off the first not Q output 214. The first reset input 212 is the reset input of the first flip flop 151. A transient input to the first reset input 212 actuates the first not Q output 214 and turns off the first Q output 213. The first Q output 213 is the Q output of the first flip flop 151. The first Q output 213 controls the operation of the transistor 155. The first not Q output 214 is the not Q output of the first flip flop 151. The first not Q output 214 is not used in the first potential embodiment of the disclosure.

The second set input 221 is the set input of the second flip flop 152. A transient input to the second set input 221 actuates the second Q output 223 and turns off the second not Q output 224. The second reset input 222 is the reset input of the second flip flop 152. A transient input to the second reset input 222 actuates the second not Q output 224 and turns off the second Q output 223. The second Q output 223 is the Q output of the second flip flop 152. The second Q output 223 controls the illumination of the second LED set 225. The second not Q output 224 is the not Q output of the second flip flop 152. The second not Q output 224 controls the illumination of the first LED set 215. The first limit resistor 216 limits the flow of electric power from the second not Q output 224 into the first LED set 215. The second limit resistor 226 limits the flow of electric power from the second Q output 223 into the second LED set 225.

The transistor 155 operates as switch. When a voltage is applied to the base 158, current will flow into the base 158 and the transistor 155 will act like a closed switch allowing current to flow from the collector 156 to the emitter 157. When the voltage is removed from the base 158, the transistor will act like an open switch disrupting current flow from the collector 156 to the emitter 157.

The transistor 155 is an electrically controlled switching device. The transistor 155 is defined elsewhere in this disclosure. The transistor 155 electrically connects to the first flip flop 151, the second flip flop 152, and the wireless power circuit 125. The transistor 155 controls the flow of the electricity from the wireless power circuit 125 into the second flip flop 152. The operation of the transistor 155 is controlled by the first Q output 213 of the first flip flop 151. Specifically, the first Q output 213 of the first flip flop 151 electrically connects to the base 158 of the transistor 155 such that the activation of the first Q output 213 enables the transistor 155 to provide electric power from the wireless power circuit 125 into the second flip flop 152.

Each of the plurality of LED sets 123 is an electric circuit that comprises one or more LEDs. The LED is an electrical device used to generate an illumination. The LED is defined elsewhere in this disclosure. Each of the plurality of LED sets 123 generates a portion of the illumination generated by the control circuit 102. Each LED contained in any LED set selected from the plurality of LED sets 123 is identical. By identical is meant that color generated by each LED contained in the selected LED set is identical. The color of any LED set initially selected from the plurality of LED sets 123 is visually distinct from the color of any subsequently selected LED set selected from the plurality of LED sets 123. The amount of illumination generated by the control circuit 102 is controlled by controlling the illumination of each of the plurality of LED sets 123.

Each of the plurality of limit resistors 124 is an electric circuit element known as a resistor. There is a one to one correspondence between the plurality of limit resistors 124 and the plurality of LED sets 123. Each of the plurality of limit resistors 124 forms a series electric circuit its associated LED set and the flip flop associated with the associated LED set. Each of the plurality of limit resistors 124 limits the flow of electric energy through the plurality of LED sets 123.

The following fourteen paragraphs describe a second potential embodiment of the disclosure.

In the second potential embodiment of the disclosure, the plurality of RFID interrogation signals 132 further comprises a fifth RFID interrogation signal 165, a sixth RFID interrogation signal 166, a seventh RFID interrogation signal 167, and an eighth RFID interrogation signal 168. The fifth RFID interrogation signal 165, the sixth RFID interrogation signal 166, the seventh RFID interrogation signal 167, and the eighth RFID interrogation signal 168 are described elsewhere in this disclosure.

In the second potential embodiment of the disclosure, the plurality of RFID interrogation signals 132 further comprises a fifth RFID tracking tag 145, a sixth RFID tracking tag 146, a seventh RFID tracking tag 147, and an eighth RFID tracking tag 148.

The fifth RFID tracking tag 145 is the tracking tag selected from the plurality of RFID tracking tags 121 that is tuned to detect the transmission of the fifth RFID interrogation signal 165 by the personal data device 103. The fifth RFID tracking tag 145 electrically connects as an input to the third flip flop 153.

The sixth RFID tracking tag 146 is the tracking tag selected from the plurality of RFID tracking tags 121 that is tuned to detect the transmission of the sixth RFID interrogation signal 166 by the personal data device 103. The sixth RFID tracking tag 146 electrically connects as an input to the third flip flop 153.

The seventh RFID tracking tag 147 is the tracking tag selected from the plurality of RFID tracking tags 121 that is tuned to detect the transmission of the seventh RFID interrogation signal 167 by the personal data device 103. The seventh RFID tracking tag 147 electrically connects as an input to the fourth flip flop 154.

The eighth RFID tracking tag 148 is the tracking tag selected from the plurality of RFID tracking tags 121 that is tuned to detect the transmission of the eighth RFID interrogation signal 168 by the personal data device 103. The eighth RFID tracking tag 148 electrically connects as an input to the fourth flip flop 154.

The fifth RFID interrogation signal 165 is the interrogation signal selected from the plurality of RFID interrogation signals 132 that indicates to the control circuit 102 that the third LED set 235 should be illuminated. The sixth RFID interrogation signal 166 is the interrogation signal selected from the plurality of RFID interrogation signals 132 that indicates to the control circuit 102 that the third LED set 235 should be extinguished.

The seventh RFID interrogation signal 167 is the interrogation signal selected from the plurality of RFID interrogation signals 132 that indicates to the control circuit 102 that the fourth LED set 245 should be illuminated. The eighth RFID interrogation signal 168 is the interrogation signal selected from the plurality of RFID interrogation signals 132 that indicates to the control circuit 102 that the fourth LED set 245 should be extinguished.

In the second potential embodiment of the disclosure, the plurality of flip flops 122 further comprises a third flip flop and a fourth flip flop 154. The first flip flop 151 further controls the flow of the electricity used to power the third flip flop 153 and the fourth flip flop 154. The transistor 155 electrically connects to the third flip flop 153 and the fourth flip flop 154 such that the third flip flop 153 and the fourth flip flop 154 are simultaneously powered with the second flip flop 152.

In the second potential embodiment of the disclosure, the plurality of LED sets 123 further comprises a third LED set 235 and a fourth LED set 245. In the second potential embodiment of the disclosure, the plurality of limit resistors 124 further comprises a third limit resistor 236 and a fourth limit resistor 246. The third LED set 235 and the third limit resistor 236 electrically connect to the third flip flop 153. The fourth LED set 245 and the fourth limit resistor 246 electrically connect to the fourth flip flop 153.

The third flip flop 153 is the flip flop selected from the plurality of flip flops 122 that controls the operation of the third LED set 235 of the plurality of LED sets 123. The third flip flop 153 comprises a third set input 231, a third reset input 232, a third Q output 233, and a third not Q output 234.

The fourth flip flop 154 is the flip flop selected from the plurality of flip flops 122 that controls the operation of the fourth LED set 245 of the plurality of LED sets 123. The fourth flip flop 154 comprises a fourth set input 241, a fourth reset input 242, a fourth Q output 243, and a fourth not Q output 244.

The third set input 231 is the set input of the third flip flop 153. A transient input to the third set input 231 actuates the third Q output 233 and turns off the third not Q output 234. The third reset input 232 is the reset input of the third flip flop 153. A transient input to the third reset input 232 actuates the third not Q output 234 and turns off the third Q output 233. The third Q output 233 is the Q output of the third flip flop 153. The third Q output 233 controls the illumination of the third LED set 235. The third not Q output 234 is the not Q output of the third flip flop 153. The third not Q output 234 is not used in the second potential embodiment of the disclosure. The third limit resistor 236 limits the flow of electric power from the third Q output 233 into the third LED set 235.

The fourth set input 241 is the set input of the fourth flip flop 154. A transient input to the fourth set input 241 actuates the fourth Q output 243 and turns off the fourth not Q output 244. The fourth reset input 242 is the reset input of the fourth flip flop 154. A transient input to the fourth reset input 242 actuates the fourth not Q output 244 and turns off the fourth Q output 243. The fourth Q output 243 is the Q output of the fourth flip flop 154. The fourth Q output 243 controls the illumination of the fourth not Q output 244. The fourth not Q output 244 is the not Q output of the fourth flip flop 154. The fourth not Q output 244 is not used in the second potential embodiment of the disclosure. The fourth limit resistor 246 limits the flow of electric power from the fourth Q output 243 into the fourth LED set 245.

The following twelve paragraphs describe the wireless power circuit 125 used in all potential embodiments of the invention 100.

The wireless power circuit 125 is an electrical circuit. The wireless power circuit 125 powers the operation of the control circuit 102. The wireless power circuit 125 is an electrochemical device. The wireless power circuit 125 converts chemical potential energy into the electrical energy required to power the control circuit 102. The wireless power circuit 125: a) draws AC electrical energy from a national electric grid 185; and, b) wirelessly broadcasts the AC electrical energy received from the national electric grid 185 to the induction circuit 172. The wireless power circuit 125 comprises an energy broadcast circuit 171 and an induction circuit 172. The energy broadcast circuit 171 broadcasts the AC electrical energy received from the national electric grid 185 to the induction circuit 172. The induction circuit 172 electrically connects to and provides electrical energy to an electric circuit. The induction circuit 172: a) receives the AC electrical energy broadcast from the energy broadcast circuit 171; b) converts the received AC electrical energy into DC electrical energy suitable for use by the control circuit 102 associated with the induction circuit 172; and, c) transfers the DC electrical energy to a battery 194.

The energy broadcast circuit 171 is an electrical circuit. The energy broadcast circuit 171 draws AC electrical energy from the national electric grid 185. The energy broadcast circuit 171 processes the AC electrical energy for broadcast. The energy broadcast circuit 171 broadcasts the processed AC electrical energy to the induction circuit 172. The energy broadcast circuit 171 comprises a first AC/DC converter 181, a frequency generating circuit 182, a first amplifier 183, a broadcast antenna 184, and a national electric grid 185. The first AC/DC converter 181, the frequency generating circuit 182, the first amplifier 183, the broadcast antenna 184, and the national electric grid 185 are electrically interconnected.

The first AC/DC converter 181 is an AC/DC converter. The first AC/DC converter 181 electrically connects to the national electric grid 185. The first AC/DC converter 181 receives AC electrical energy from the national electric grid 185 and converts the AC electrical energy into a regulated DC voltage.

The frequency generating circuit 182 is an electrical circuit. The frequency generating circuit 182 is an oscillating circuit that receives DC electrical energy from the DC regulated voltage provided by the first AC/DC converter 181. The frequency generating circuit 182 generates an AC electrical voltage at the broadcast frequency of the energy broadcast circuit 171.

The first amplifier 183 is an electrical circuit. The first amplifier 183 is a power amplifier. The first amplifier 183 receives as an input the AC voltage generated by the frequency generating circuit 182 and amplifies the received AC electrical voltage such that the signal broadcast by the energy broadcast circuit 171 contains sufficient energy to broadcast electrical energy for use by the induction circuit 172.

The broadcast antenna 184 is an electrical device. The broadcast antenna 184 receives the amplified AC electrical energy from the first amplifier 183 and broadcasts the amplified AC electrical energy as electromagnetic radiation to the induction circuit 172.

The national electric grid 185 is source of the electrical energy required to operate the wireless power circuit 125. The national electric grid 185 is defined elsewhere in this disclosure.

The design and use of an AC/DC converter, a frequency generating circuit 182, the first amplifier 183, and the broadcast antenna 184 are well-known and documented in the electrical arts.

The induction circuit 172 is an electrical circuit. The induction circuit 172 comprises a battery 194, an induction antenna 191, a second AC/DC converter 192, and a voltage regulator 193. The battery 194, the induction antenna 191, the second AC/DC converter 192, and the voltage regulator 193 are electrically interconnected. The induction circuit 172 receives the AC electrical energy broadcast from the energy broadcast circuit 171 and processes the received AC electrical energy into a regulated DC voltage that recharges the battery 194 with DC electrical energy.

The induction antenna 191 is an electrical device. The induction antenna 191 receives the electromagnetic radiation generated by the energy broadcast circuit 171 and converts the received electromagnetic radiation into AC electrical energy. The induction antenna 191 electrically connects the received AC electrical energy to the second AC/DC converter 192 for processing.

The second AC/DC converter 192 is an AC/DC converter. The second AC/DC converter 192 electrically connects to the induction antenna 191. The second AC/DC converter 192 receives AC electrical energy from the induction antenna 191 and converts the AC electrical energy into a source of DC electrical energy with an unregulated DC voltage.

The voltage regulator 193 is an electrical circuit. The voltage regulator 193 converts the unregulated DC electrical energy received from the second AC/DC converter 192 into a regulated DC voltage source that provides regulated DC electrical energy to the battery 194. The battery 194 is an electrochemical device. The battery 194 converts chemical potential energy into the electrical energy used to power the control circuit 102. The diode 195 is an electrical device that limits the flow of electricity to one direction. The diode 195 installs between the battery 194 and the voltage regulator 193 such that electricity will not back flow from the battery 194 into the voltage regulator 193.

The stylus 104 is an electro mechanical device. The primary function of the stylus 104 within the context of the invention 100 is to act as a repeater. Specifically, the stylus 104 receives the plurality of RFID interrogation signals 132 transmitted by the personal data device 103 and retransmits the plurality of RFID interrogation signals 132 at a higher energy level than is otherwise available from the personal data device 103. The use of the stylus 104 allows the personal data device 103 to control the operation of the control circuit 102 at greater distances than would otherwise be available from the personal data device 103. The stylus 104 is designed to further perform the traditional functions performed by the stylus 104 when used with the personal data device 103.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Amplifier: As used in this disclosure, an amplifier refers to an electronic component that increases voltage, current, or power of an input signal. Specifically, within this disclosure, an amplifier refers to a differential amplifier. A differential amplifier is a device with two inputs with a single output. A differential amplifier amplifies the voltage difference between the two inputs. The gain of an amplifier is defined as the ratio of the output to the input as measured in a set of units selected from the group consisting of electric voltage, electric current, and electric power. Electric voltage is the most commonly selected unit.

Antenna: As used in this disclosure, an antenna is an electrical apparatus used to: a) convert electrical current into electromagnetic radiation; and, b) convert electromagnetic radiation into electrical current. An antenna is a type of transducer.

Battery: As used in this disclosure, a battery is a chemical device consisting of one or more cells, in which chemical energy is converted into electricity and used as a source of power. Batteries are commonly defined with a positive terminal and a negative terminal.

CIELAB: As used in this disclosure, the CIELAB is a color space coordinate system that is used to specify color. The CIELAB is a system that is defined and maintained by the International Commission on Illumination. At the time of this disclosure, the current CIELAB is referred to as CIELAB2000. The CIELAB specifies a color in a three-dimensional color space that is often referred to as the LAB. The overall difference between a target shade standard and a measured sample shade is called the delta E. A delta E of greater than 0.5 is easily seen by most people.

Client: As used in this disclosure, a client is an individual who is designated to receive a service.

Color: As used in this disclosure, a color refers to the visible portion of the spectrum that is reflected off of an object that is exposed to an external source of electromagnetic radiation. A color is often referred to as a shade.

Color Spectrum: As used in this disclosure, a color spectrum refers to the organization of ranges visible electromagnetic radiation into specific colors. Within this disclosure: a) electromagnetic radiation with wavelengths of 380 nm to 450 nm are called violet; b) electromagnetic radiation with wavelengths of 450 nm to 485 nm are called blue; c) electromagnetic radiation with wavelengths of 485 nm to 500 nm are called cyan; d) electromagnetic radiation with wavelengths of 500 nm to 565 nm are called green; e) electromagnetic radiation with wavelengths of 565 nm to 590 nm are called yellow; f) electromagnetic radiation with wavelengths of 590 nm to 625 nm are called orange; and, g) electromagnetic radiation with wavelengths of 625 nm to 740 nm are called red.

Communication Link: As used in this disclosure, a communication link refers to the structured exchange of data between two objects.

Contrasting Color: As used in this disclosure, the term contrasting color is applied to a comparison of a first color and a second color. Technically, contrasting colors means that the second color is drawn from a different section of the color wheel than a first color. The term complementary color means that the second color is drawn from the section of the color wheel that is diametrically opposite from the section of the color wheel the first color is drawn from.

Control Circuit: As used in this disclosure, a control circuit is an electrical circuit that manages and regulates the behavior or operation of a device.

Cosmetic Structure: As used in this disclosure, a cosmetic structure is a mechanical structure that is worn by an individual.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electrical Ground: As used in this disclosure, an electrical ground is a common reference voltage that is used in the design and implementation of electrical circuits. An electrical ground is often, but not necessarily, the discharge point of electric currents flowing through an electric circuit.

External Power Source: As used in this disclosure, an external power source is a source of the energy that is externally provided to enable the operation of the present disclosure. Examples of external power sources include, but are not limited to, electrical power sources and compressed air sources.

Finger: As used in this disclosure, a finger is the portion of the hand that encloses the proximal phalange bone and its associated distal phalange bone of a hand. The finger nail is a claw like structure that is formed at the distal end of the finger.

Flip Flop: As used in this disclosure, a flip flop is a bi-stable electronic device that is used to store information. The stable state of the flip flop can be changed through the application of one or more control signals. The flip flop is a circuit that is often used to store information. The flip flop circuit comprises a plurality of inputs, referred to as the set input and the reset input, and a plurality of outputs, referred to as Q and not Q. When a temporary positive voltage is applied to the set input, the Q output actuates to a positive voltage relative to the not Q output (which is generally set to the electrical ground voltage). The Q output remains at the positive voltage until a new temporary input voltage is received. When a temporary positive voltage is applied to the reset input, the not Q output actuates to a positive voltage relative to the Q output (which is generally set to the electrical ground voltage). The not Q output remains at the positive voltage until a new temporary input voltage is received.

Form Factor: As used in this disclosure, the term form factor refers to the size and shape of an object.

Frequency: As used in this disclosure, frequency is a count of the number of repetitions of a cyclic process has been completed within a set period of time.

Induction: As used in this disclosure, induction refers to a process where a first process selected from the group consisting of an electric current or an electromagnetic field generates or interacts with a second process selected from the group consisting of an electric current or an electromagnetic field.

Inductive Charging Device: As used in this disclosure, an inductive charging device is an electrical device. The inductive charging device transfers energy from a first electric device to a second electric device. The first electric device transfers electric energy to the second electric device using induction.

Integrated Circuit: As used in this disclosure, an integrated circuit is: a) an electric circuit that is formed directly into a semiconducting material; that, b) replicates an electric circuit that can be formed from discrete electrical components.

Inverter: As used in this disclosure, an inverter is an electrical device that converts a DC voltage into an AC voltage. Methods to design and build inverters are well known in the electrical arts. An inverter is also known as a frequency generator.

Hue: As used in this disclosure, a hue refers to a specific color.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Near Field Communication: As used in this disclosure, near field communication, commonly referred to as NFC, is an RFID technology and communication protocol that is commonly implemented on personal data devices. The operating range of near field technology is generally less than 20 centimeters.

Non-Euclidean Disk: As used in this disclosure, a non-Euclidean structure is a disk-shaped structure wherein the congruent end (faces) of the disk structure lies on a non-Euclidean plane.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Repeater: As used in this disclosure, a repeater is an electrical device that receives a first signal from a first communication channel and transmits a duplicate second signal over a second communication channel. When a radio frequency wireless communication channel is used as both the first communication channel and the second communication channel the frequencies of operation of the first communication channel and the second communication channels may or may not be identical.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

RFID: As used in this disclosure, RFID refers to Radio Frequency Identification technology. RFID is a wireless technology that uses electromagnetic field to identify and retrieve data from tracking tags that are placed on or near an object.

RFID Interrogator: As used in this disclosure, an RFID interrogator is a device that transmits a radio signal at frequency designed to activate RFID tracking tags that are tuned to operate at that frequency.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator. Within this disclosure, both passive and active RFID tracking tags are used.

Spectrum: As used in this disclosure, a spectrum refers to the distribution and amplitude of the component frequencies of a source of electromagnetic radiation. Spectrums are typically organized and displayed by frequency or frequency range.

Toe: As used in this disclosure, a toe is the portion of the foot that encloses the proximal phalange bone and its associated distal phalange bone of a foot. The toe nail is a claw like structure that is formed at the distal end of the foot. The structure of the toe is similar to the structure of the finger.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Visually Distinct: As used in this disclosure, visually distinct is a comparative term between the perceived color of a first object and the perceived color of a second object. The second object is said to be visually distinct from the first object if the delta E between the measured CIELAB color specification of the first object and the measured CIELAB color specification of the second object is greater than 1.5. As a practical matter, most people would consider a delta E of greater than 1.5 to be different colors under almost any light source.

Volt: As used in this disclosure, a volt refers to the difference in electrical potential energy between two points in an electric circuit. A volt is measured as joules per coulomb. The term voltage refers to a quantitative measure of the volts between the two points.

Voltage Regulator: As used in this disclosure, a voltage regulator refers to an electrical circuit that takes unregulated voltage as its power input and provides a constant output voltage independent of variations to input power supply voltage or output, or load, current.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An illuminated synthetic nail comprising
a press on nail, a control circuit, and a personal data device;
wherein the control circuit mounts is an illumination circuit that mounts in the press on nail;
wherein the personal data device forms a wireless communication link with the control circuit;
wherein the personal data device controls the operation of the control circuit;
wherein the press on nail is a cosmetic structure that is worn by a client on a location selected from the group consisting of a finger nail and a toe nail;
wherein by controlling the operation is meant the personal data device controls the color of the illumination generated by the control circuit;
wherein the press on nail contains the control circuit;
wherein the press on nail illuminates the control circuit;
wherein the press on nail comprises a nail structure and an adhesive;
wherein the nail structure is a mechanical structure;
wherein the nail structure is a polymer based structure;
wherein the nail structure is a non-Euclidean disk structure;
wherein a form factor of the nail structure is selected such that the nail structure emulates the form factor of a human nail;
wherein the control circuit mounts on the nail structure such that the illumination of the control circuit is visible from the exterior of the client wearing the illuminated synthetic nail;
wherein the adhesive is a chemical compound;
wherein the adhesive secures the nail structure to the selected nail of the client;
wherein the personal data device is a programmable electrical device that provides data management and communication services;
wherein the personal data device comprises an application and a plurality of RFID interrogation signals;
wherein the personal data device forms a wireless communication link with the control circuit;
wherein the personal data device controls an operation of the control circuit;
wherein by controlling the operation of the control circuit is meant that the personal data device turns the control circuit on and off;
wherein by controlling the operation of the control circuit is meant that the personal data device changes the color of the illumination generated by the control circuit;
wherein the application is used to generate and transmit the plurality of RFID interrogation signals;
wherein the plurality of RFID interrogation signals is a radio frequency transmission that is generated by the near field communication functionality of the personal data device;
wherein each of the plurality of RFID interrogation signals is tuned to a frequency;
wherein the personal data device controls the operation of the control circuit through the selection and transmission of each of the plurality of RFID interrogation signals;
wherein the plurality of RFID interrogation signals forms the wireless communication link with the control circuit.

2. The illuminated synthetic nail according to claim 1
wherein the control circuit is an electric circuit;
wherein the control circuit is formed as an integrated circuit;
wherein the control circuit mounts in the nail structure of the press on nail;
wherein the control circuit generates the illumination used to illuminate the press on nail;
wherein the color of the illumination of the control circuit is adjustable;
wherein the control circuit is an independently powered electric circuit;
wherein by independently powered is meant that the control circuit can operate without an electrical connection to an external power source.

3. The illuminated synthetic nail according to claim 2
wherein the control circuit comprises a plurality of RFID tracking tags, a plurality of flip flops, a plurality of LED sets, a plurality of limit resistors, and a wireless power circuit;
wherein the plurality of RFID tracking tags, the plurality of flip flops, the plurality of LED sets, the plurality of limit resistors, and the wireless power circuit are electrically interconnected.

4. The illuminated synthetic nail according to claim 3
wherein the plurality of RFID tracking tags comprises a first RFID tracking tag, a second RFID tracking tag, a third RFID tracking tag, and a fourth RFID tracking tag;
wherein the plurality of RFID interrogation signals comprises a first RFID interrogation signal, a second RFID interrogation signal, a third RFID interrogation signal, and a fourth RFID interrogation signal;
wherein the first RFID tracking tag is the tracking tag selected from the plurality of RFID tracking tags that is tuned to detect the transmission of the first RFID interrogation signal by the personal data device;
wherein the second RFID tracking tag is the tracking tag selected from the plurality of RFID tracking tags that is tuned to detect the transmission of the second RFID interrogation signal by the personal data device;
wherein the third RFID tracking tag is the tracking tag selected from the plurality of RFID tracking tags that is tuned to detect the transmission of the third RFID interrogation signal by the personal data device;
wherein the fourth RFID tracking tag is the tracking tag selected from the plurality of RFID tracking tags that is tuned to detect the transmission of the fourth RFID interrogation signal by the personal data device.

5. The illuminated synthetic nail according to claim 4
wherein the plurality of flip flops comprises a first flip flop, a second flip flop, and a transistor;
wherein the transistor electrically connects to the first flip flop;
wherein the transistor further comprises a collector, an emitter, and a base;
wherein the first RFID tracking tag electrically connects as an input to the first flip flop;
wherein the second RFID tracking tag electrically connects as an input to the first flip flop;
wherein the third RFID tracking tag electrically connects as an input to the second flip flop;
wherein the fourth RFID tracking tag electrically connects as an input to the second flip flop;
wherein the plurality of LED sets comprises a first LED set and a second LED set;
wherein the plurality of limit resistors comprises a first limit resistor and a second limit resistor;
wherein the first LED set and the first limit resistor electrically connect to the second flip flop;
wherein the second LED set and the second limit resistor electrically connect to the second flip flop.

6. The illuminated synthetic nail according to claim 5
wherein each of the plurality of RFID tracking tags is an RFID tracking tag;
wherein each of the plurality of RFID tracking tags electrically connects to a flip flop selected from the plurality of flip flops;
wherein each of the plurality of RFID tracking tags is an antenna that is tuned to a frequency;
wherein the tuned frequency of any initially RFID tracking tag selected from the plurality of RFID tracking tags is different from the tuned frequency of any subsequent RFID tracking tag selected from the plurality of RFID tracking tags;
wherein there is a one to one correspondence between the plurality of RFID tracking tags and the plurality of RFID interrogation signals;
wherein the tuned frequency of each RFID tracking tag selected from the plurality of RFID tracking tags matches the transmission frequency of the RFID interrogation signal selected from the plurality of RFID interrogation signals that corresponds with the selected RFID tracking tag;
wherein each of the plurality of RFID tracking tags is a passive electrical circuit;
wherein each of the plurality of RFID tracking tags transmits the received RFID interrogation signal to an input of the connected flip flop such that the RFID interrogation signal triggers the operation of the connected flip flop.

7. The illuminated synthetic nail according to claim 6
wherein each of the plurality of flip flops is an electric circuit;
wherein each of the plurality of flip flops generates a stable output;
wherein the stable output of each of the plurality of flip flops is changed by a transient input signal;
wherein each of the plurality of flip flops electrically connects to two RFID tracking tags selected from the plurality of RFID tracking tags;
wherein each flip flop selected from the plurality of flip flops receives transient inputs from the two RFID tracking tags associated with the selected flip flop;
wherein each flip flop selected from the plurality of flip flops comprises one or more outputs;
wherein a flip flop selected from the plurality of flip flops powers the operation of the unselected flip flops remaining in the plurality of flip flops;
wherein the unselected flip flops remaining in the plurality of flip flops power the illumination of the plurality of LED sets.

8. The illuminated synthetic nail according to claim 7
wherein the first flip flop comprises a first set input, a first reset input, a first Q output, and a first not Q output;
wherein the second flip flop comprises a second set input, a second reset input, a second Q output, and a second not Q output;
wherein the first set input is the set input of the first flip flop;
wherein a transient input to the first set input actuates the first Q output and turns off the first not Q output;

wherein the first reset input is the reset input of the first flip flop;
wherein a transient input to the first reset input actuates the first not Q output and turns off the first Q output;
wherein the first Q output is the Q output of the first flip flop;
wherein the first Q output controls the operation of the transistor;
wherein the first not Q output is the not Q output of the first flip flop;
wherein the first not Q output is not used in the first potential embodiment of the disclosure;
wherein the second set input is the set input of the second flip flop;
wherein a transient input to the second set input actuates the second Q output and turns off the second not Q output;
wherein the second reset input is the reset input of the second flip flop;
wherein a transient input to the second reset input actuates the second not Q output and turns off the second Q output;
wherein the second Q output is the Q output of the second flip flop;
wherein the second Q output controls the illumination of the second LED set;
wherein the second not Q output is the not Q output of the second flip flop;
wherein the second not Q output controls the illumination of the first LED set;
wherein the first limit resistor limits the flow of electric power from the second not Q output into the first LED set;
wherein the second limit resistor limits the flow of electric power from the second Q output into the second LED set.

9. The illuminated synthetic nail according to claim 8
wherein the energy broadcast circuit is an electrical circuit;
wherein the energy broadcast circuit draws AC electrical energy from the national electric grid;
wherein the energy broadcast circuit processes the AC electrical energy for broadcast;
wherein the energy broadcast circuit broadcasts the processed AC electrical energy to the induction circuit;
wherein the induction circuit is an electrical circuit;
wherein the induction circuit comprises a battery, an induction antenna, a second AC/DC converter, and a voltage regulator;
wherein the battery, the induction antenna, the second AC/DC converter, and the voltage regulator are electrically interconnected;
wherein the induction circuit receives the AC electrical energy broadcast from the energy broadcast circuit and processes the received AC electrical energy into a regulated DC voltage that recharges the battery with DC electrical energy.

10. The illuminated synthetic nail according to claim 9
wherein the wireless power circuit is an electrical circuit;
wherein the wireless power circuit powers the operation of the control circuit;
wherein the wireless power circuit: a) draws AC electrical energy from a national electric grid; and, b) wirelessly broadcasts the AC electrical energy received from the national electric grid to the induction circuit;
wherein the wireless power circuit comprises an energy broadcast circuit and an induction circuit;
wherein the energy broadcast circuit broadcasts the AC electrical energy received from the national electric grid to the induction circuit;
wherein the induction circuit electrically connects to and provides electrical energy to an electric circuit;
wherein the induction circuit: a) receives the AC electrical energy broadcast from the energy broadcast circuit; b) converts the received AC electrical energy into DC electrical energy suitable for use by the control circuit associated with the induction circuit; and, c) transfers the DC electrical energy to a battery.

11. The illuminated synthetic nail according to claim 10
wherein the first RFID interrogation signal is the interrogation signal selected from the plurality of RFID interrogation signals that indicates to the control circuit that the transistor should be actuated to a closed switch position;
wherein the second RFID interrogation signal is the interrogation signal selected from the plurality of RFID interrogation signals that indicates to the control circuit that the transistor should be actuated to an open switch position;
wherein the third RFID interrogation signal is the interrogation signal selected from the plurality of RFID interrogation signals that indicates to the control circuit that the first LED set should be extinguished and the second LED set should be actuated;
wherein the fourth RFID interrogation signal is the interrogation signal selected from the plurality of RFID interrogation signals that indicates to the control circuit that the second LED set should be extinguished and the first LED set should be actuated;
wherein the first flip flop is the flip flop selected from the plurality of flip flops that controls the operation of the transistor;
wherein the first flip flop controls the flow of the electricity used to power the second flip flop;
wherein the second flip flop is the flip flop selected from the plurality of flip flops that controls the operation of the both the first LED set and the second LED set of the plurality of LED sets.

12. The illuminated synthetic nail according to claim 11
wherein the transistor operates as switch;
wherein the transistor is an electrically controlled switching device;
wherein the transistor electrically connects to the first flip flop, the second flip flop, and the wireless power circuit;
wherein the transistor controls the flow of the electricity from the wireless power circuit into the second flip flop;
wherein the operation of the transistor is controlled by the first Q output of the first flip flop;
wherein specifically, the first Q output of the first flip flop electrically connects to the base of the transistor such that the activation of the first Q output enables the transistor to provide electric power from the wireless power circuit into the second flip flop.

13. The illuminated synthetic nail according to claim 12
wherein each of the plurality of LED sets is an electric circuit that comprises one or more LEDs;
wherein the LED is an electrical device used to generate an illumination;
wherein each of the plurality of LED sets generates a portion of the illumination generated by the control circuit;

wherein each LED contained in any LED set selected from the plurality of LED sets is identical;
wherein by identical is meant that color generated by each LED contained in the selected LED set is identical;
wherein the color of any LED set initially selected from the plurality of LED sets is visually distinct from the color of any subsequently selected LED set selected from the plurality of LED sets;
wherein the amount of illumination generated by the control circuit is controlled by controlling the illumination of each of the plurality of LED sets;
wherein each of the plurality of limit resistors is an electric circuit element known as a resistor;
wherein there is a one to one correspondence between the plurality of limit resistors and the plurality of LED sets;
wherein each of the plurality of limit resistors forms a series electric circuit its associated LED set and the flip flop associated with the associated LED set;
wherein each of the plurality of limit resistors limits the flow of electric energy through the plurality of LED sets.

14. The illuminated synthetic nail according to claim 13 wherein the energy broadcast circuit comprises a first AC/DC converter, a frequency generating circuit, a first amplifier, a broadcast antenna, and a national electric grid;
wherein the first AC/DC converter, the frequency generating circuit, the first amplifier, the broadcast antenna, and the national electric grid are electrically interconnected;
wherein the first AC/DC converter is an AC/DC converter;
wherein the first AC/DC converter electrically connects to the national electric grid;
wherein the first AC/DC converter receives AC electrical energy from the national electric grid and converts the AC electrical energy into a regulated DC voltage;
wherein the frequency generating circuit is an electrical circuit;
wherein the frequency generating circuit is an oscillating circuit that receives DC electrical energy from the DC regulated voltage provided by the first AC/DC converter;
wherein the frequency generating circuit generates an AC electrical voltage at the broadcast frequency of the energy broadcast circuit;
wherein the first amplifier is an electrical circuit;
wherein the first amplifier is a power amplifier;
wherein the first amplifier receives as an input the AC voltage generated by the frequency generating circuit and amplifies the received AC electrical voltage such that the signal broadcast by the energy broadcast circuit contains sufficient energy to broadcast electrical energy for use by the induction circuit;
wherein the broadcast antenna is an electrical device;
wherein the broadcast antenna receives the amplified AC electrical energy from the first amplifier and broadcasts the amplified AC electrical energy as electromagnetic radiation to the induction circuit;
wherein the national electric grid is the source of the electrical energy required to operate the wireless power circuit.

15. The illuminated synthetic nail according to claim 14 wherein the induction antenna is an electrical device;
wherein the induction antenna receives the electromagnetic radiation generated by the energy broadcast circuit and converts the received electromagnetic radiation into AC electrical energy;
wherein the induction antenna electrically connects the received AC electrical energy to the second AC/DC converter for processing;
wherein the second AC/DC converter is an AC/DC converter;
wherein the second AC/DC converter electrically connects to the induction antenna;
wherein the second AC/DC converter receives AC electrical energy from the induction antenna and converts the AC electrical energy into a source of DC electrical energy with an unregulated DC voltage;
wherein the voltage regulator is an electrical circuit;
wherein the voltage regulator converts the unregulated DC electrical energy received from the second AC/DC converter into a regulated DC voltage source that provides regulated DC electrical energy to the battery;
wherein the battery is an electrochemical device;
wherein the battery converts chemical potential energy into the electrical energy used to power the control circuit;
wherein the diode is an electrical device that limits the flow of electricity to one direction;
wherein the diode installs between the battery and the voltage regulator such that electricity will not back flow from the battery into the voltage regulator.

16. The illuminated synthetic nail according to claim 15 wherein the plurality of RFID interrogation signals further comprises a fifth RFID interrogation signal, a sixth RFID interrogation signal, a seventh RFID interrogation signal, and an eighth RFID interrogation signal;
wherein the plurality of RFID interrogation signals further comprises a fifth RFID tracking tag, a sixth RFID tracking tag, a seventh RFID tracking tag, and an eighth RFID tracking tag;
wherein the fifth RFID tracking tag is the tracking tag selected from the plurality of RFID tracking tags that is tuned to detect the transmission of the fifth RFID interrogation signal by the personal data device;
wherein the fifth RFID tracking tag electrically connects as an input to the third flip flop;
wherein the sixth RFID tracking tag is the tracking tag selected from the plurality of RFID tracking tags that is tuned to detect the transmission of the sixth RFID interrogation signal by the personal data device;
wherein the sixth RFID tracking tag electrically connects as an input to the third flip flop;
wherein the seventh RFID tracking tag is the tracking tag selected from the plurality of RFID tracking tags that is tuned to detect the transmission of the seventh RFID interrogation signal by the personal data device;
wherein the seventh RFID tracking tag electrically connects as an input to the fourth flip flop;
wherein the eighth RFID tracking tag is the tracking tag selected from the plurality of RFID tracking tags that is tuned to detect the transmission of the eighth RFID interrogation signal by the personal data device;
wherein the eighth RFID tracking tag electrically connects as an input to the fourth flip flop;
wherein the fifth RFID interrogation signal is the interrogation signal selected from the plurality of RFID interrogation signals that indicates to the control circuit that the third LED set should be illuminated;
wherein the sixth RFID interrogation signal is the interrogation signal selected from the plurality of RFID interrogation signals that indicates to the control circuit that the third LED set should be extinguished;

wherein the seventh RFID interrogation signal is the interrogation signal selected from the plurality of RFID interrogation signals that indicates to the control circuit that the fourth LED set should be illuminated;

wherein the eighth RFID interrogation signal is the interrogation signal selected from the plurality of RFID interrogation signals that indicates to the control circuit that the fourth LED set should be extinguished.

17. The illuminated synthetic nail according to claim 16 wherein the plurality of flip flops further comprises a third flip flop and a fourth flip flop;

wherein the first flip flop further controls the flow of the electricity used to power the third flip flop and the fourth flip flop;

wherein the transistor electrically connects to the third flip flop and the fourth flip flop such that the third flip flop and the fourth flip flop are simultaneously powered with the second flip flop;

wherein the plurality of LED sets further comprises a third LED set and a fourth LED set;

wherein the plurality of limit resistors further comprises a third limit resistor and a fourth limit resistor;

wherein the third LED set and the third limit resistor electrically connect to the third flip flop;

wherein the fourth LED set and the fourth limit resistor electrically connect to the fourth flip flop;

wherein the third flip flop is the flip flop selected from the plurality of flip flops that controls the operation of the third LED set of the plurality of LED sets;

wherein the third flip flop comprises a third set input, a third reset input, a third Q output, and a third not Q output;

wherein the fourth flip flop is the flip flop selected from the plurality of flip flops that controls the operation of the fourth LED set of the plurality of LED sets;

wherein the fourth flip flop comprises a fourth set input, a fourth reset input, a fourth Q output, and a fourth not Q output;

wherein the third set input is the set input of the third flip flop;

wherein a transient input to the third set input actuates the third Q output and turns off the third not Q output;

wherein the third reset input is the reset input of the third flip flop;

wherein a transient input to the third reset input actuates the third not Q output and turns off the third Q output;

wherein the third Q output is the Q output of the third flip flop;

wherein the third Q output controls the illumination of the third LED set;

wherein the third not Q output is the not Q output of the third flip flop;

wherein the third not Q output is not used in the second potential embodiment of the disclosure;

wherein the third limit resistor limits the flow of electric power from the third Q output into the third LED set;

wherein the fourth set input is the set input of the fourth flip flop;

wherein a transient input to the fourth set input actuates the fourth Q output and turns off the fourth not Q output;

wherein the fourth reset input is the reset input of the fourth flip flop;

wherein a transient input to the fourth reset input actuates the fourth not Q output and turns off the fourth Q output;

wherein the fourth Q output is the Q output of the fourth flip flop;

wherein the fourth Q output controls the illumination of the fourth not Q output;

wherein the fourth not Q output is the not Q output of the fourth flip flop;

wherein the fourth not Q output is not used in the second potential embodiment of the disclosure;

wherein the fourth limit resistor limits the flow of electric power from the fourth Q output into the fourth LED set.

18. The illuminated synthetic nail according to claim 17 wherein illuminated synthetic nail further comprises a stylus;

wherein the stylus is a repeater;

wherein the stylus is an electro mechanical device;

wherein the primary function of the stylus within the context of the illuminated synthetic nail is to act as a repeater;

wherein stylus receives the plurality of RFID interrogation signals transmitted by the personal data device and retransmits the plurality of RFID interrogation signals at a higher energy level than is otherwise available from the personal data device.

\* \* \* \* \*